Patented Dec. 29, 1942

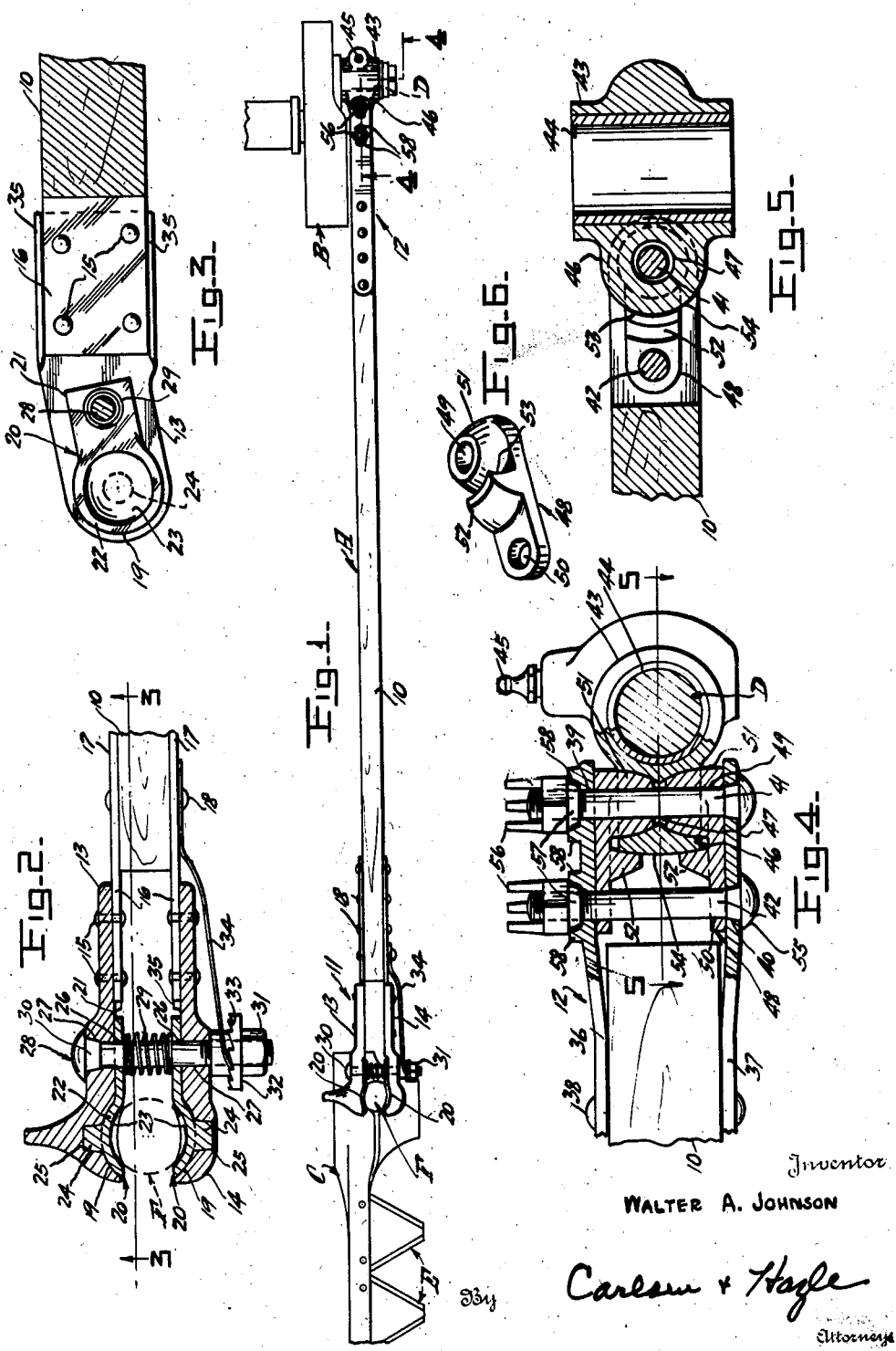

2,306,447

UNITED STATES PATENT OFFICE 2,306,447

PITMAN

Walter A. Johnson, Rochester, Minn.

Application August 27, 1941, Serial No. 408,477

5 Claims. (Cl. 308—67)

My invention relates generally to improvements in pitmans for mowers and similar machinery and more specifically to distinct improvements in the end connections used in such pitmans for attaching the same to driving and driven parts of the mower.

The primary object of the invention is to provide pitman connections which will permit all required movements and adjustments to be made without interference, and which are so constructed that convenient attachment and detachment are provided for at the sickle or knife end of the pitman where usually required. Another object is to provide a pitman in which provision is made for the replacement of worn or broken parts without removing any bolts or rivets from the bar or beam of the pitman. Still another object is to provide a pitman having end connections of such nature that permanent alignment of the bearings may be maintained and with wear plates adapted to take the actual wear, such wear plates being arranged for removal and replacement without destroying or disturbing other parts of the connections.

These and other more detailed and specific objects will be disclosed in the course of the following specification, reference being had to the accompanying drawing, in which—

Fig. 1 is a plan view of a pitman constructed in accordance with my invention and showing adjacent parts of the mower, including a section of the knife or sickle and the flywheel.

Fig. 2 is a horizontal cross section, on an enlarged scale, of the sickle or knife connection of the pitman.

Fig. 3 is a section along the line 3—3 in Fig. 2.

Fig. 4 is a enlarged fragmentary section along the line 4—4 in Fig. 1.

Fig. 5 is a section along the line 5—5 in Fig. 4.

Fig. 6 is a perspective view of one of the replaceable bearing or wear plates used in the connection shown in Figs. 4 and 5.

Referring now more particularly and by reference characters to the drawing, the pitman is designated generally at A and connects the flywheel B to the knife head C in such manner as to transform the rotary movement of the wheel to a reciprocating movement of the knife. The flywheel B has an eccentrically located crank pin D to which one end of the pitman is connected, and the knife head C, carrying the blades E, has a ball F for connection to the other end of the pitman.

The pitman comprises the usual elongated bar or beam 10, of wood or other suitable material, and at opposite ends carries a knife head or cutter connection 11 and a crank pin connection 12, these connections being the subject matter of my present invention.

The connection 11 comprises a pair of clasp members or arms 13 and 14 secured, as by rivets 15, to the extended ends 16 of flat springs or spring tangs 17 which are riveted at 18 to opposite sides of the pitman bar 10. The extended or free ends of the clasp members 13 and 14 are spaced apart and normally spread by the resiliency of the springs 17 to straddle the ball F, and on their inner faces have concavities or sockets 19. Replaceable bushings or wear plates 20 are provided and have flat end portions 21 adapted to lie against the flat inner surfaces of the clasp members 13 and 14 and concave-convex, bossed ends 22 which are adapted to lie in the aforesaid sockets 19. These ends 22 present inner, concaved and shallow sockets or bearings 23 to engage opposite sides of the ball F. Stubs or pilots 24 on the outer convexed sides of the bossed ends 22 of the wear plates fit corresponding recesses 25 in the clasp members to properly locate the plates in the sockets 19.

The ends 21 of the wear plates 20 have apertures 26 which fall in registry with apertures 27 in the clasp members 13 and 14 to receive a draw bolt 28 which is passed crosswise through and between the clasp members and which, of course, aids in properly aligning and locating the wear plates. To hold the wear plates in place, especially when the clasp members are spread apart, an expansion spring 29 is coiled around the mid-portion of the bolt 28 and bears at its ends against the wear plates to hold them flatly against inner surfaces of the clasp members.

The bolt 28 has a head 30 at one end bearing against one clasp member and at the opposite end carries a threaded nut 31 which may be turned down to draw the clasp members together and bring the wear plates 20 to bear on the ball. This nut 31 has a diametrically enlarged portion 32 notched at 33 to engage the end of a nut locking spring 34, which, unless pressed down by hand to clear the notches, will prevent the nut from loosening on the bolt.

The clasp members 13 and 14 each have marginal lips or flanges 35 turned inwardly along the upper and lower longitudinal edges of the spring ends 16 to prevent relative twisting of the clasp members and springs, even should the rivets 15 be loosened by wear and vibration.

Obviously the construction of this knife connection 11 provides for convenient replacement of the main wearing parts, the plates 20, without disturbing the clasp members or springs 17, and a supply of the simple and inexpensive wear plates may, of course, be kept on hand for such replacements. Also the sockets 23 may vary in size in various wear plates to fit a ball F of any usual diameter. Should the clasp arms themselves become broken they may also be replaced without disturbing the mounting of the springs 17 on the pitman.

The crank pin connection 12 also comprises two clasp members or straps 36—37 which are secured on opposite sides of the pitman bar 10 by rivets or similar fasteners 38 and which are located on the opposite faces of said bar with respect to the spring tangs 17 to properly angle the connections relative to each other. Said clasp members 36—37 extend endwise from the pitman bar and are provided with spaced apertures 39—40 for the reception of two bolts 41 and 42 as clearly shown, one bolt 41 being located near the ends of the clasp members and the other spaced inwardly therefrom.

The crank pin D of the flywheel B has journaled thereon a bearing or box 43 having a pin receiving bushing 44 and with conventional lubricating means including an oiling connection 45. From one side of this box an ear 46 projects having a bore 47 disposed on an axis at right angles to the axis of the crank pin D and adapted to loosely engage the outermost bolt 41, said ear being of such thickness furthermore as to loosely enter and fit between the extended ends of the clasp members 36—37.

Wear plates or bearing bushings are again provided for this connection and are designated generally at 48. Each of said wear plates has spaced openings 49—50 to pass the respective bolts 41—42. One wear plate 48 is placed against the inner surface of each clasp member 36—37 where it is held in position by the bolts 41—42 and the two plates thus mounted are disposed at opposite sides of the bearing ear 46 which is placed over the outermost bolt 41 as aforesaid. The wear plates have projecting bearing bosses 51 coaxial with the openings 49 which thus may enter into the opposite ends of the bore 47 to provide the actual bearing surfaces for the ear 46, and said bosses taper inwardly toward each other in the direction of the bearing axis to fit the correspondingly shaped, outwardly enlarged ends of said bore. Obviously by drawing the bolt 41 tight the bearing bosses 51 may be forced into the ends of the bore 47 to provide a bearing for the ear 46 and as wear occurs in these parts the bolt may be drawn tighter as required, the clasp arms 36—37 having sufficient resiliency for this purpose. In no case, however, is there any actual bearing contact or wear on the bolt 41 itself.

Each wear plate 48 further is provided with a lug 52 spaced from the bearing boss 51 and having its face 53, adjacent to said boss, rounded or curved substantially on a radius centered at the axis of said boss. The lugs 52 project inwardly from the wear plates in position to engage and bear against the rounded end of the bearing ear 46 and both this end surface 54 and the engaging surfaces 53 of the lugs are angled to provide for takeup when wear occurs as will be readily evident in Fig. 4.

The bolts 41—42 have heads 55 engaging one clasp arm and carry castellated nuts 56 on their other ends to engage the other clasp member and permit the members to be drawn together as described above. The nuts 56 furthermore have rounded ends 57 which fit into and between rounded shoulders 58 formed on outer faces of the clasp members. The bearing thus provided between the nuts and clasp members in combination with the bearing provided both inside and outside of the ear 46, by the bosses 51 and lugs 52, obviously will prevent any relative rocking movement or twisting of the ear 46 between the clasp members, except for the necessary pivotal movement about the axis of bolt 41. Uneven wear and looseness will thus be positively prevented.

It will be noted that at each end connection of the pitman the wear is taken by simple and inexpensive wear plates which are arranged to be conveniently removed and replaced when worn. Also the use of spring material for the tangs 17 prevents crystallization and fatigue in the clasp members 13 and 14 such as to cause breakage when they are spread apart to clear the ball F and similar breakage of the clasp members 36 and 37 at the other end of the pitman is prevented since they need not be spread to remove the wear plates. It should be unnecessary at any time, therefore, to remove the rivets fastening the clasp members to the pitman bar 10, which constitutes one of the most undesirable repairs necessary in these machines.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a mower pitman assembly including a bearing box engaging the crank pin and having an apertured bearing ear on one side, means for connecting the pitman and said bearing box comprising spaced clasp members extending from the pitman, a bolt passed through and between the clasp members and extending loosely through the bearing ear, wear plates disposed between the clasp members and bearing ear and having openings passing the said bolt, and bearing members extending from the wear plates into the bearing ear for pivotal engagement therewith.

2. In a mower pitman structure including a bearing box having a bearing ear extending from one side and said ear having an opening extending from end to end, a pair of clasp members extending from the pitman and disposable in spaced relation to the ends of the bearing ear, a wear plate disposed between each clasp member and the adjacent end of the bearing ear, a bearing boss extending from each wear plate into the opening in said bearing ear, and means for detachably securing said wear plates to the clasp members.

3. In a mower pitman structure including a bearing box having a bearing ear extending from one side and said ear having an opening extending from end to end, a pair of clasp members extending from the pitman and disposable in spaced relation to the ends of the bearing ear, a wear plate disposed between each clasp member and the adjacent end of the bearing ear, a bearing boss extending from each wear plate into pivotal engagement with the adjacent end of the opening in the bearing ear, a bolt passed through the clasp members and wear plates and loosely through the said opening in the bearing ear, and another bolt passed through the clasp members and wear plates in spaced relation to the first mentioned bolt.

4. In a mower pitman structure including a bearing box having a rounded ear extended from one side and said ear having a bearing bore, means for connecting the pitman and bearing box, comprising clasp members secured to the pitman, wear plates detachably connected to the clasp members, and means on said wear plates for oscillatably engaging both the exterior surface of the bearing ear and the interior of the bore therein.

5. In a mower pitman structure including a bearing box having a rounded ear extended from one side and said ear having a bearing bore, means for connecting the pitman and bearing box, comprising clasp members secured to the pitman, wear plates detachably connected to the clasp members, bearing bosses on the wear plates adapted to pivotally engage the bore in said bearing ear, and lug members on the wear plates adapted to pivotally engage an outer rounded surface of the bearing ear.

WALTER A. JOHNSON.